(12) United States Patent
Piccin

(10) Patent No.: US 10,030,441 B2
(45) Date of Patent: Jul. 24, 2018

(54) ROLLER SHUTTER AND STORAGE COMPARTMENT COMPRISING SAID ROLLER SHUTTER

(71) Applicant: Faurecia Innenraum Systeme GmbH, Hagenbach Allemagne (DE)

(72) Inventor: Hugo Piccin, Munich (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/485,586

(22) Filed: Sep. 12, 2014

(65) Prior Publication Data

US 2015/0075733 A1   Mar. 19, 2015

(30) Foreign Application Priority Data

Sep. 13, 2013 (EP) .................................... 13306255

(51) Int. Cl.
*B60R 7/04* (2006.01)
*E06B 9/44* (2006.01)
*B60J 1/00* (2006.01)
*B32B 27/40* (2006.01)
*B60R 13/02* (2006.01)
*B32B 5/18* (2006.01)
(Continued)

(52) U.S. Cl.
CPC .................. *E06B 9/44* (2013.01); *B32B 5/18* (2013.01); *B32B 5/245* (2013.01); *B32B 5/26* (2013.01); *B32B 7/12* (2013.01); *B32B 27/40* (2013.01); *B60J 1/00* (2013.01); *B60R 7/04* (2013.01); *B60R 13/0262* (2013.01); *B32B 2262/0246* (2013.01); *B32B 2262/0253* (2013.01); *B32B 2262/0261* (2013.01); *B32B 2262/0276* (2013.01); *B32B 2262/062* (2013.01); *B32B 2266/025* (2013.01); *B32B 2266/0278* (2013.01); *B60R 2011/0094* (2013.01)

(58) Field of Classification Search
CPC ......... B60R 13/0262; B60R 2011/0094; B32B 27/40; E06B 2009/1511; E06B 2009/1516; E06B 2009/1561; E06B 9/115
USPC ...... 160/238, 23.1, 37, 231.1; 428/215, 334, 428/425.1, 537.1; 296/97.1, 97.8
See application file for complete search history.

(56) References Cited

U.S. PATENT DOCUMENTS 2,054,499 A * 9/1936 Florman ................... E06B 7/22
                                                        156/250
2,184,971 A * 12/1939 Allen .......................... 428/157
(Continued)

FOREIGN PATENT DOCUMENTS

DE            838361 C  *  5/1952  ............. E06B 9/115
DE   102007059233 A1  *  6/2009  ............. B60R 13/02
(Continued)

OTHER PUBLICATIONS

English translation of "DE102007059233" obtained from <http://ep.espacenet.com/>.*
(Continued)

*Primary Examiner* — Katherine W Mitchell
*Assistant Examiner* — Johnnie A. Shablack
(74) *Attorney, Agent, or Firm* — Reising Ethington P.C.

(57) ABSTRACT

A roller shutter that has a carrier and a decorative lining laminated over the carrier. The roller shutter includes at least one stress limiting layer configured to limit stress applied on the decorative lining when bending the roller shutter.

20 Claims, 3 Drawing Sheets

(51) Int. Cl.
  *B32B 5/24* (2006.01)
  *B32B 5/26* (2006.01)
  *B32B 7/12* (2006.01)
  *B60R 11/00* (2006.01)

(56) References Cited

U.S. PATENT DOCUMENTS

| | | | | |
|---|---|---|---|---|
| 2,224,209 A * | 12/1940 | Allen | | 428/190 |
| 2,563,111 A * | 8/1951 | Hampson | | B27D 1/00 156/310 |
| 3,084,403 A * | 4/1963 | Elmendorf | | 428/166 |
| 3,425,889 A * | 2/1969 | Willits, Jr. | | 248/220.43 |
| 3,717,247 A * | 2/1973 | Moore | | 206/321 |
| 3,870,391 A * | 3/1975 | Nims | | 312/297 |
| 4,101,704 A * | 7/1978 | Hiles | | B32B 27/08 428/218 |
| 4,157,845 A * | 6/1979 | Queveau | | 296/220.01 |
| 4,205,107 A * | 5/1980 | Jaschke et al. | | 428/58 |
| 4,291,083 A * | 9/1981 | Breitenbach | | E06B 9/115 428/163 |
| 4,350,721 A * | 9/1982 | Nagase | | 428/33 |
| 4,446,177 A * | 5/1984 | Munoz et al. | | 428/15 |
| 4,848,437 A * | 7/1989 | Laniado et al. | | 160/370.22 |
| 4,923,244 A * | 5/1990 | Clenet | | 296/214 |
| 4,942,084 A * | 7/1990 | Prince | | B27D 1/00 428/317.1 |
| 5,013,810 A * | 5/1991 | Sarpeshkar | | C08G 18/10 528/59 |
| 5,073,431 A * | 12/1991 | Martinuzzo | | B27D 1/00 144/346 |
| 5,169,699 A * | 12/1992 | Prince | | 428/68 |
| 5,375,385 A * | 12/1994 | Feder | | B32B 3/14 52/385 |
| 5,443,923 A * | 8/1995 | Laniado et al. | | 428/476.1 |
| 5,565,263 A * | 10/1996 | Ohsumi | | B27D 1/00 264/328.1 |
| 5,989,681 A * | 11/1999 | Martino | | B05D 5/061 428/15 |
| 6,103,333 A * | 8/2000 | Keith | | B32B 21/08 144/332 |
| 6,180,211 B1 * | 1/2001 | Held | | B32B 27/00 427/207.1 |
| 6,231,940 B1 * | 5/2001 | Aichner et al. | | 428/36.2 |
| 6,468,625 B1 * | 10/2002 | Brown, Jr. | | 428/114 |
| 6,499,785 B2 * | 12/2002 | Eguchi | | 296/37.8 |
| 6,672,554 B2 * | 1/2004 | Fukuo | | B60N 3/102 224/926 |
| 6,699,349 B1 * | 3/2004 | Sporle et al. | | 156/244.12 |
| 6,769,215 B1 * | 8/2004 | Carkner | | 52/411 |
| 6,871,686 B2 * | 3/2005 | Eshpar | | 160/231.1 |
| 6,883,852 B2 * | 4/2005 | Laskey | | B60N 3/102 220/350 |
| 7,014,726 B2 * | 3/2006 | Whiting | | 156/230 |
| 7,081,300 B2 * | 7/2006 | Laurence | | B32B 27/36 428/147 |
| 7,475,954 B1 * | 1/2009 | Latunski | | 312/297 |
| 7,540,391 B2 * | 6/2009 | Kato | | 220/252 |
| 7,581,773 B2 * | 9/2009 | Strasser et al. | | 296/1.09 |
| 7,588,280 B2 * | 9/2009 | Dobos et al. | | 296/37.12 |
| 7,597,130 B2 * | 10/2009 | Ichimaru et al. | | 160/89 |
| 7,735,538 B2 * | 6/2010 | Ogawa | | 160/230 |
| 7,954,871 B2 * | 6/2011 | Hipshier | | B60N 2/4686 296/24.34 |
| 8,007,020 B2 * | 8/2011 | Hipshier | | B60R 7/04 296/24.34 |
| 8,101,264 B2 * | 1/2012 | Pace et al. | | 428/195.1 |
| 8,579,151 B2 * | 11/2013 | Kodama et al. | | 220/812 |
| 8,579,348 B1 * | 11/2013 | Myers | | 296/24.34 |
| 8,777,002 B2 * | 7/2014 | Lonsdale et al. | | 206/320 |
| 8,857,878 B2 * | 10/2014 | Hipshier et al. | | 296/1.08 |
| 8,925,616 B2 * | 1/2015 | Ganz | | 160/231.2 |
| 8,932,424 B2 * | 1/2015 | Johnson et al. | | 156/232 |
| 9,085,265 B2 * | 7/2015 | Hipshier | | |
| 9,126,537 B2 * | 9/2015 | Preisler | | B60N 2/6009 |
| 9,138,943 B2 * | 9/2015 | Weinberg | | B29C 70/465 |
| 9,352,483 B2 * | 5/2016 | Piccin | | B27D 1/083 |
| 9,481,323 B2 * | 11/2016 | Hipshier | | B29C 45/1676 |
| 2002/0005424 A1 * | 1/2002 | Lange et al. | | 224/539 |
| 2003/0052129 A1 * | 3/2003 | Fukuo | | 220/350 |
| 2003/0148044 A1 * | 8/2003 | Auld et al. | | 428/13 |
| 2003/0150548 A1 * | 8/2003 | Votteler | | B32B 21/14 156/242 |
| 2004/0029030 A1 * | 2/2004 | Murray | | 430/130 |
| 2004/0118851 A1 * | 6/2004 | Shinomiya | | 220/345.1 |
| 2005/0098257 A1 * | 5/2005 | Bauer | | B27D 1/00 156/212 |
| 2005/0276874 A1 * | 12/2005 | Menaldo et al. | | 425/129.1 |
| 2005/0281997 A1 * | 12/2005 | Grah | | B32B 7/02 428/215 |
| 2007/0102463 A1 * | 5/2007 | Thomas | | 224/275 |
| 2007/0125500 A1 * | 6/2007 | Gosling et al. | | 160/37 |
| 2008/0292851 A1 * | 11/2008 | Egerer | | B29C 43/18 428/196 |
| 2009/0174121 A1 * | 7/2009 | Hayes | | B29C 45/1671 264/447 |
| 2009/0255625 A1 * | 10/2009 | Fox et al. | | 156/247 |
| 2010/0066121 A1 * | 3/2010 | Gross | | D04H 13/006 296/146.5 |
| 2010/0075558 A1 * | 3/2010 | Muller | | B29C 45/14467 442/229 |
| 2010/0206467 A1 * | 8/2010 | Durand | | B27D 1/00 156/219 |
| 2011/0045306 A1 * | 2/2011 | Johnson et al. | | 428/423.1 |
| 2011/0097592 A1 * | 4/2011 | Wang | | B29C 45/14811 428/515 |
| 2011/0260359 A1 * | 10/2011 | Durand | | B29C 33/56 264/269 |
| 2012/0015176 A1 * | 1/2012 | Riebel | | B32B 27/06 428/323 |
| 2013/0049389 A1 * | 2/2013 | Hipshier | | B29C 44/086 296/1.08 |
| 2013/0075955 A1 * | 3/2013 | Piccin | | B29C 45/1418 264/403 |
| 2014/0004314 A1 * | 1/2014 | Durand | | B29C 33/06 428/174 |
| 2014/0021733 A1 * | 1/2014 | Hipshier et al. | | 296/1.08 |
| 2014/0295181 A1 * | 10/2014 | Minomo et al. | | 428/354 |
| 2014/0349094 A1 * | 11/2014 | Jonza | | B32B 5/18 428/215 |
| 2014/0349102 A1 * | 11/2014 | Piccin | | B32B 5/022 428/221 |
| 2015/0064374 A1 * | 3/2015 | Jain et al. | | 428/34 |
| 2015/0075733 A1 * | 3/2015 | Piccin | | 160/323.1 |
| 2015/0086747 A1 * | 3/2015 | Beuchel | | B32B 21/08 428/106 |

FOREIGN PATENT DOCUMENTS

| | | | | |
|---|---|---|---|---|
| DE | 202010011377 U1 | 11/2010 | | |
| EP | 1690740 A1 | 8/2006 | | |
| EP | 1777109 A1 | 4/2007 | | |
| EP | 2805801 A1 * | 11/2014 | | B32B 5/022 |
| FR | 2991937 A1 * | 12/2013 | | B60Q 3/0283 |
| JP | 2000280206 A * | 10/2000 | | |
| WO | WO2008064210 A2 | 5/2008 | | |
| WO | WO 2011023901 A1 * | 3/2011 | | B27D 1/083 |

OTHER PUBLICATIONS

English translation of "JP20002080206" obtained from <http://ep.espacenet.com/>.*
European Search Report for application No. EP 13 30 6255.4, dated Jan. 27, 2014, 6 pages.

* cited by examiner

ROLLER SHUTTER AND STORAGE COMPARTMENT COMPRISING SAID ROLLER SHUTTER

TECHNICAL FIELD

The present invention relates to a roller shutter, in particular a roller shutter for closing an aperture in a vehicle interior.

BACKGROUND

It is possible to close a vehicle interior aperture such as a vehicle interior storage compartment with a roller shutter. The roller shutter is flexible and is slidably mounted along guiding rails to selectively close or open the aperture.

It is desirable to provide the visible face of a vehicle interior compartment roller shutter with a decorative layer for improving quality perceived by the user.

US 2007/0125500 A1 discloses a vehicle interior storage compartment roller shutter, the roller shutter comprising a carrier layer formed of ribs extending crosswise, a supporting layer joining the ribs and made integral with the ribs, an intermediate layer and a decorative layer.

However, upon use, the roller shutter is bent and the decorative is subjected to bending and stretching stresses. Repeated use may induce appearance of marks and/or cracks on the visible face of the decorative layer, thus affecting quality perceived by the user.

SUMMARY

One of the objects of the invention is to propose a roller shutter that has a good appearance that is maintained over time.

To this end, there is provided a roller shutter comprising a carrier and a decorative lining laminated over the carrier, wherein the roller shutter comprises at least one stress limiting layer configured to limit stress applied on the decorative lining when bending the roller shutter.

In other embodiments, the roller shutter may comprise ore or several of the following features, taken in isolation or in any technically feasible combination:
  the stress limiting layer is formed of a compressible intermediate layer laminated between the carrier and the decorative lining;
  the compressible intermediate layer is made of foam or gel;
  the compressible intermediate layer is made of polyurethane foam, polypropylene foam or polyethylene foam;
  the stress limiting layer is formed of a hard intermediate layer laminated between the support layer and the decorative lining, the hard intermediate layer having a hardness of more than 30 shore A, namely more than 60 shore A, preferably more than 80 shore A;
  the hard intermediate layer is made of silicone or polyurethane;
  the stress limiting layer is formed of a pre-compressed layer which is pre-compressed along a longitudinal direction of the roller shutter and bonded to the decorative lining so as to longitudinally pre-compress the decorative lining;
  the roller shutter comprises pre-tensioned members embedded in the pre-compressed layer for imparting residual pre-compression to the pre-compressed layer;
  the carrier comprises transverse members extending transversely relative to the roller shutter;
  the decorative lining comprising a backing layer laminated to a decorative layer;
  the backing layer is a textile, a woven fabric, a non-woven fabric, a plastic film or a cardboard sheet;
  the decorative lining comprises at least one lignocellulosic layer, namely a wood sheet;
  the roller shutter comprises a protection coating covering the decorative lining.

The invention also relates to a storage compartment, namely vehicle interior compartment, comprising a cavity and a roller shutter as defined above.

BRIEF DESCRIPTION OF THE DRAWINGS

The invention and its advantages will be better understood upon reading the following description, given solely by way of example and made with respect to the appended drawings, in which.

DETAILED DESCRIPTION OF THE ILLUSTRATED EMBODIMENT(S)

Figure 1:
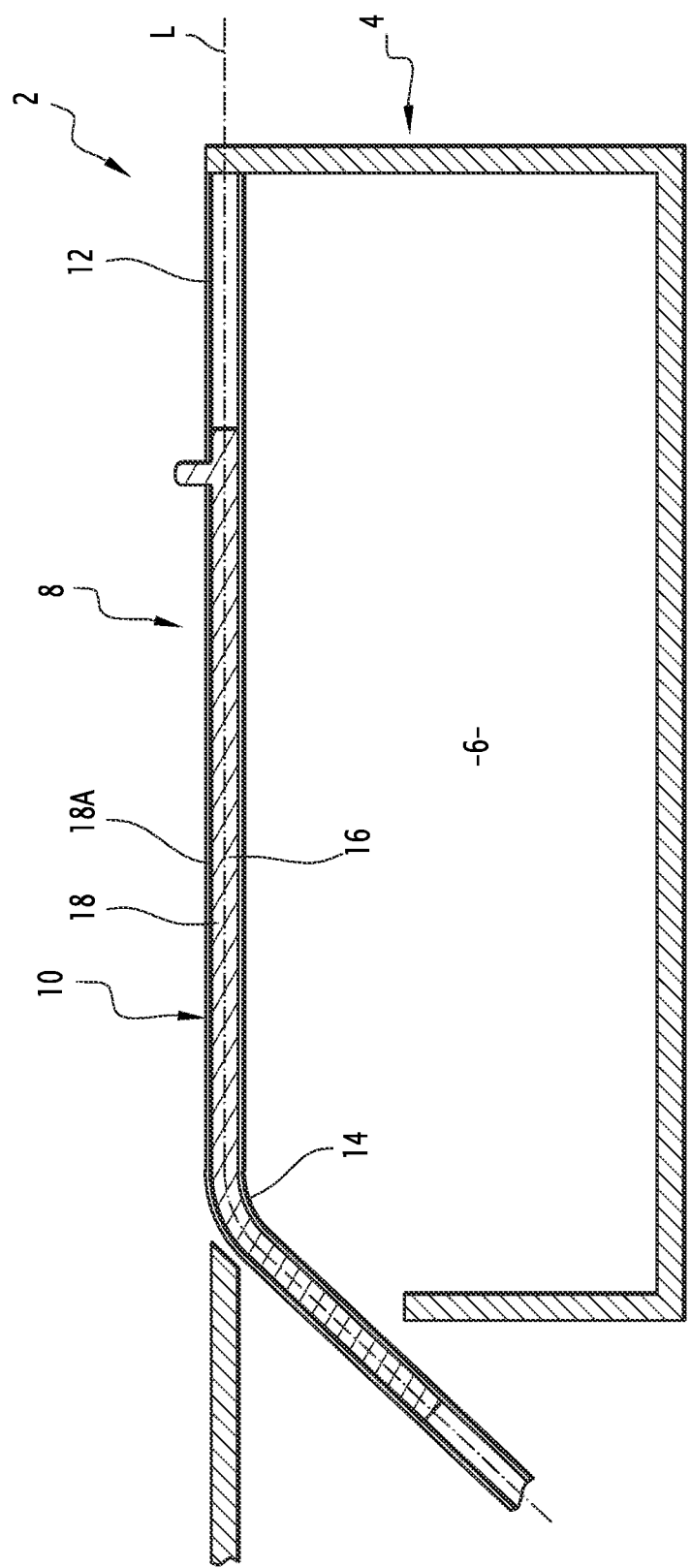
FIG. 1 is a schematic side view of a vehicle interior storage compartment comprising an aperture closed by a roller shutter.

The vehicle interior storage compartment 2 illustrated in FIG. 1 comprises a container 4 defining a storage cavity 6 opening through an aperture 8 and a roller shutter 10 slidably mounted with respect to the container 4 for selectively closing or opening the aperture 8. The roller shutter 10 is partially opened on FIG. 1.

The roller shutter 10 extends along a longitudinal line L along which it slides. The roller shutter 10 is flexible longitudinally and rigid transversely.

The roller shutter 10 is mounted slidable relative to the aperture 8 along two parallel tracks 12 bordering the aperture 8 and extending along the longitudinal line L. Only one track 12 is visible on FIG. 1. In a known manner, each track 12 slidably receives a respective longitudinal edge of the roller shutter 10. The tracks 12 have at least one curved section 14. Upon sliding the roller shutter 10 along the tracks 12, the roller shutter 10 is bent longitudinally.

The roller shutter 10 is laminated. The roller shutter 10 comprises a carrier 16 and a decorative lining 18 laminated over the carrier 16. The decorative lining 18 has a visible face 18A. The visible face 18A faces opposite the carrier 16.

In the curved section 14, the decorative lining 18 is located outside the curve and the carrier 16 is located inside the curve. The decorative lining 18 thus tends to be subjected to tension whereas the carrier 16 tends to be subjected to compression.

Upon use, repeated cycles of traction and release of the decorative lining 18 may affect negatively the visible face 18A of the decorative lining 18. In particular, marks and/or cracks may appear.

In view of preserving the appearance of the decorative lining 18 over the time, the roller shutter 10 comprises at least one stress limiting layer arranged for limiting stresses imparted to the decorative lining 18 when bending the roller shutter 10, in particular stresses imparted by the carrier 16.

Figure 2:
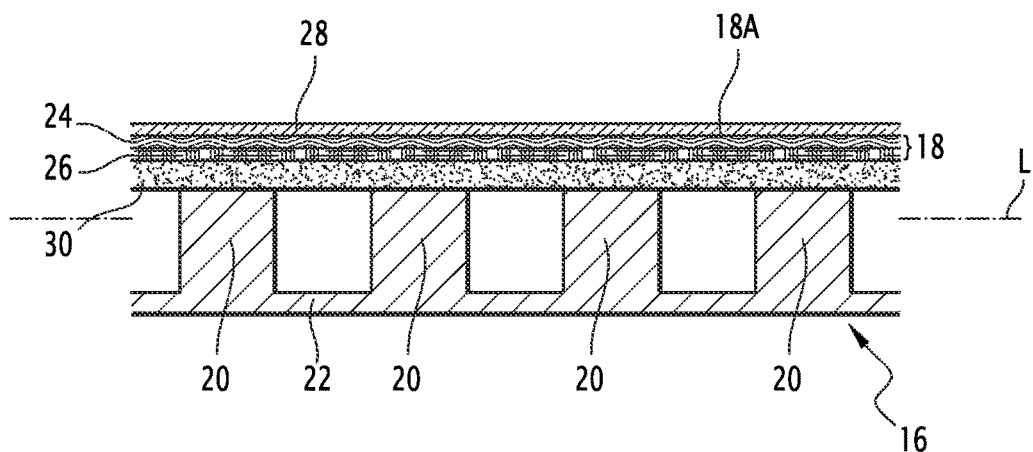
FIG. 2 is a schematic cross-sectional view of a roller shutter according to a first embodiment.

The roller shutter 10 illustrated on FIG. 2 comprises a carrier 16 having discrete transverse members 20 distributed along the roller shutter 10. Each transverse member 20 extends transversely to the longitudinal line L (perpendicular to the plane of FIG. 2). The transverse members 20 are distributed along the longitudinal line L. The transverse members 20 are spaced along the longitudinal line L, with a constant pitch.

As illustrated on FIG. 2, the carrier 16 optionally comprises a continuous web 22 joining the transverse members 20. The web 22 extends longitudinally.

The transverse members 20 are located between the web 22 and the decorative lining 18. Alternatively, the transverse members 20 are located on the face of the web 22 facing the decorative layer and the web 22 is located between the transverse members 20 and the decorative lining 18.

As illustrated on FIG. 2, the web 22 and the transverse members 20 are made integrally in one piece of material. Alternatively, the web 22 and the transverse members 20 are distinct and are joined together, for example by bonding with an adhesive.

The carrier 16 is made for example of acrylonitrile butadiene styrene (ABS), thermoplastic polyurethane (TPU), a mix of acrylonitrile butadiene styrene and thermoplastic polyurethane (ABS-TPU), polyamide (PA) or polypropylene (PP).

The decorative lining 18 is continuous longitudinally.

The decorative lining 18 comprises a decorative layer 24. The decorative layer is made for example of lignocellulosic fibers. The decorative layer 24 is for example made of wood fibers, preferably natural wood fibers. The decorative layer 24 comprises for example one sheet of wood. In alternative, the decorative layer 24 may comprise several superimposed sheets of woods. The decorative layer has for example a thickness comprised between 0.1 and 0.8 mm, namely between 0.1 and 0.5 mm, namely around 0.3 mm.

The decorative lining 18 comprises a backing layer 26 laminated on the decorative layer 24 on the side opposite the visible face 18A of the decorative lining 18. The backing layer 26 is for example adhesively bonded to the rear face of the decorative layer 24. The backing layer 26 is for example a textile, namely a woven or non woven fabric, a paper sheet, a cardboard sheet or a plastic film. The backing layer 26 reinforces the very thin decorative layer 24.

The backing layer 26 provided as a textile is made for example of natural or synthetic fibers, for example acrylic fibers or polypropylene (PP) fibers or polyamide (PA) fibers or polyester (PE) fibers, forming a woven or non-woven fabric.

The backing layer 26 is advantageously adhesively bonded to the decorative layer 24, namely with a glue, for example a polyvinyl acetate (PVAC) glue, a polyurethane (PUR) glue, a silicone glue or a neoprene glue. The thickness of the glue layer is for example around 0.1 mm.

The decorative layer 24 made of lignocellulosic fibers and the backing layer 26 together form a wood sheet complex (WSC).

The roller shutter 10 optionally comprises a protection coating 28 laminated on the visible face 18A of the decorative lining 18.

The function of the protection coating 28 is to protect the decorative layer 24 namely from UV radiations that may accelerate aging of the decorative layer 24. The protection coating 28 comprises one or several protection layers. The protection coating 28 is for example made of a synthetic resin, for example a varnish. The protection coating 28 is coloured, transparent or translucent. The protection coating 28 is for example applied on the decorative layer 24 in liquid state and dried to harden.

The roller shutter 10 comprises a stress limiting layer formed of an intermediate layer 30 laminated between the carrier 16 and the decorative lining 18. The intermediate layer 30 is compressible in the thickness direction of the roller shutter 10. The intermediate layer 30 is more compressible than the carrier 16 and the decorative lining 18.

The intermediate layer 30 is made for example of foam, namely synthetic foam or natural foam. Synthetic foam is for example polymeric foam. The intermediate layer 30 is made for example of polypropylene (PP) foam or polyethylene (PE) foam, a polyurethane (PUR) foam or a nitrile butadiene rubber (NBR) foam or a polyvinyl chloride (PVC) foam or ethylene-vinyl acetate (EVA) foam or any thermoplastic foam.

The intermediate layer 30 has a thickness comprises between 0.1 to 1.5 mm, namely between 0.5 to 1 mm, namely about 0.7 mm. In one example, the intermediate layer 30 is a PP foam with a 0.7 mm thickness.

The intermediate layer 30 is advantageously bonded to the decorative lining 18 with glue, for example polyurethane (PUR) glue, silicone glue, neoprene glue or polypropylene glue. The thickness of the glue layer is for example around 0.1 mm.

The intermediate layer 30 is advantageously bonded to the carrier 16 with glue, for example polyurethane (PUR) glue, silicone glue, neoprene glue. The thickness of the glue layer is for example around 0.1 mm.

When bending the roller shutter 10, the intermediate layer 30 compresses to absorb potential deformation differences between the carrier 16 and the decorative lining 18 which are due to the difference of flexibility of the carrier 16 and the decorative lining 18.

The compressible intermediate layer 30 compresses to absorb localized stresses that may be imparted by the carrier 16 to the decorative lining 18, in particular in register to the transverse members 20 which form zones of the carrier 16 of lesser flexibility. The compressible intermediate layer 30 thus limits localized stresses on the decorative lining 18. The durability of the decorative lining 18 is thus improved.

The roller shutter 10 of FIG. 2 thus comprises the carrier 16 and the decorative lining 18 laminated over the carrier 16, the roller shutter 10 comprising a compressible intermediate layer 30 laminated between the carrier 16 and the decorative lining 18. The compressible intermediate layer 30 protects the decorative lining from overstress imparted by the carrier 16.

Figure 3:
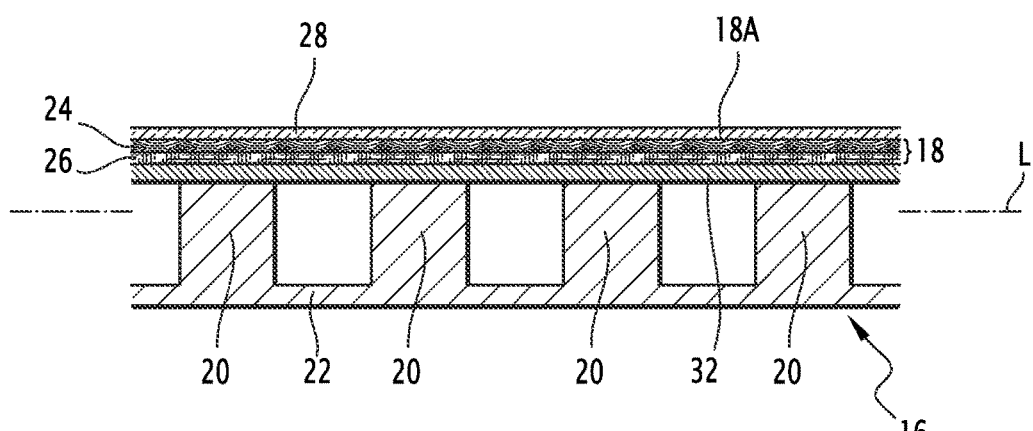
FIG. 3 is a schematic cross-sectional view of a roller shutter according to a second embodiment.

The roller shutter 10 of FIG. 3 differs from that of FIG. 2 in that the compressible intermediate layer 30 is replaced by a stress limiting layer formed of a hard intermediate layer 32 laminated between the carrier 16 and the decorative lining 18, the hard intermediate layer 32 having a hardness of more than 30 shore A, namely more than 60 shore A, preferably more than 80 shore A.

The hard intermediate layer 32 is thin to ensure that is has sufficient flexibility. The hard intermediate layer 32 has a thickness comprised between 0.1 mm and 1.5 mm, preferably between 0.5 and 1 mm.

The hard intermediate layer 32 is made for example of silicone or polyurethane (PUR).

Providing the intermediate layer with a specific hardness allows distributing a localized stress that may be imparted by the carrier 16, in particular by the transverse members 20, when bending the roller shutter 10, over a wider area on the decorative lining 18, thus minimizing stresses. The durability of the decorative layer is thus improved.

The roller shutter 10 of FIG. 3 thus comprises the carrier 16 and the decorative lining 18 laminated over the carrier 16, the roller shutter 10 comprising a hard intermediate layer 32 laminated between the carrier 16 and the decorative lining 18. The hard intermediate layer 32 protects the decorative lining 18 from overstress imparted by the carrier 16.

Figure 4:
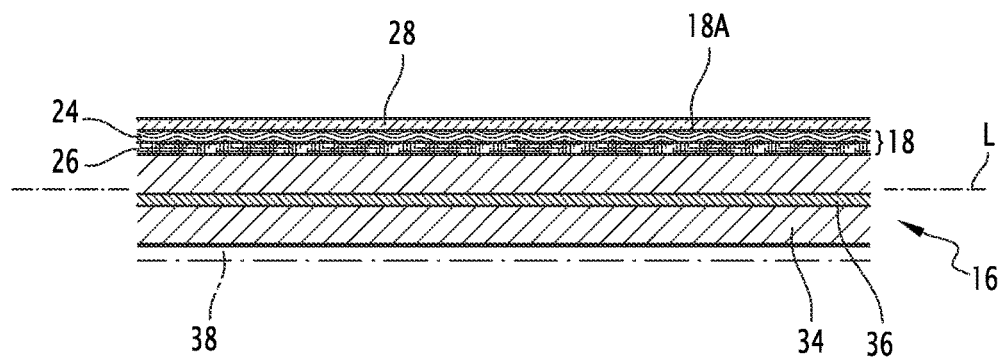
FIG. 4 is a schematic cross-sectional view of a roller shutter according to a third embodiment.

The roller shutter 4 of FIG. 4 differs from that of FIGS. 2 and 3 in that the roller shutter 10 comprises a stress limiting layer formed of a pre-compressed layer 34 which is laminated to the decorative lining 18 opposite the visible face 18A and which is pre-compressed longitudinally.

As a result, the pre-compressed layer 34 pre-compresses the decorative lining 18 which is in turn subjected to less tension stress when the roller shutter 10 is bent. This preserves durability of the decorative lining 18.

The pre-compressed layer 34 is pre-compressed by embedding pre-tensioned members 36 within the pre-compressed layer 34. As a result of pre-tension of the members 36, pre-compressed layer 34 is pre-compressed longitudinally.

Pre-tensioned members 36 are for example thread-like pre-tensioned members 36 formed for example of individual threads or formed of strands, each strand being made of several threads.

As illustrated on FIG. 4, the carrier 16 is formed by the pre-compressed layer 34. Optionally, the carrier 16 comprises an additional supporting layer 38 (as illustrated by dash lines), which is preferably laminated on the pre-compressed layer 34 opposite the decorative lining 18 or interposed between the pre-compressed layer 34 and the decorative lining 18.

The roller shutter 10 of FIG. 4 thus comprises the carrier 16 and the decorative lining 18 laminated over the carrier 16, the roller shutter 10 comprising a pre-compressed layer 34 bonded to the decorative lining 18 and pre-compressed longitudinally thus limiting tension stress in the decorative lining 18 when bending the roller shutter 10.

Figure 5:
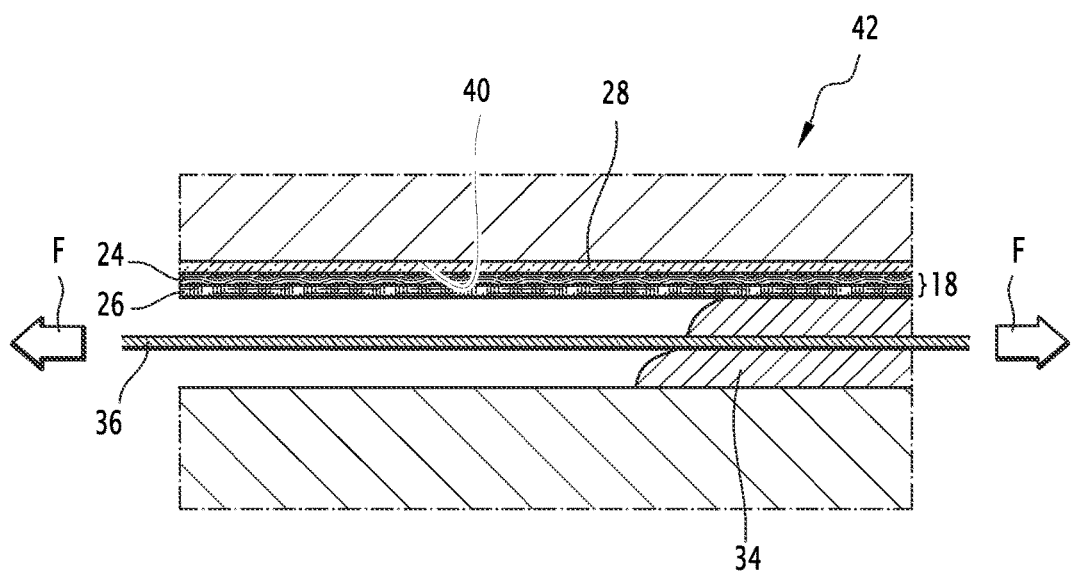
FIG. 5 is a schematic cross-sectional view of a mold illustrating a molding step of a method of manufacturing the roller shutter according to FIG. 4.

As illustrated on FIG. 5, the roller shutter 10 of FIG. 4 is manufactured for example by placing the decorative lining 18 onto a surface 40 of a mold cavity 42, the visible face 18A facing said surface 40, placing pre-tensioned members 36 in the mold cavity 42 along the rear surface of the decorative lining 18 with tensioning the pre-tensioned members 36 (arrows F), and overmolding the pre-compressed layer 34 over the pre-tensioned members 36 and the rear face of the decorative lining 18. After polymerization of the pre-compressed layer 34, the tension in the pre-tensioned members 36 is released, whereby residual pre-tension remains in the pre-tensioned members 36 and residual pre-compression remains in the pre-compressed layer 34 and the decorative lining 18 bonded thereto.

Owing to the invention, it is thus possible to provide a roller shutter 10 having a good and durable appearance despite repeated bending of the roller shutter 10 is use.

The roller shutter of the invention is particularly suited for closing interior compartments in automotive vehicle, and more generally for closing any kind of aperture.

The invention claimed is:

1. A roller shutter comprising:
 a carrier;
 a decorative lining laminated over the carrier, wherein the decorative lining is a stratified wood sheet complex comprising a backing layer laminated to a decorative layer comprising a wood sheet having a visible face, the backing layer being laminated to the decorative layer at a side of the decorative layer opposite said visible face; and
 a stress limiting layer configured to limit stress imparted by the carrier on the decorative lining when bending the roller shutter, wherein the stress limiting layer is an intermediate layer laminated between the carrier and the backing layer of the decorative lining and has a hardness of more than 30 shore A,
 wherein the carrier comprises discrete transverse members extending transversely relative to the roller shutter, the transverse members being distributed along the roller shutter and spaced along the roller shutter,
 wherein the carrier comprises a continuous web joining the transverse members, and
 wherein the transverse members are located between the web and the decorative lining.

2. The roller shutter according to claim 1, wherein the stress limiting layer has a hardness of more than 60 shore A.

3. The roller shutter according to claim 1, wherein the stress limiting layer has a hardness of more than 80 shore A.

4. The roller shutter according to claim 1, wherein the stress limiting layer is made of silicone or polyurethane.

5. The roller shutter according to claim 1, wherein the backing layer is a textile, a woven fabric, a non-woven fabric, a plastic film or a cardboard sheet.

6. The roller shutter according to claim 1, comprising a protection coating covering the decorative lining.

7. A storage compartment comprising a cavity and the roller shutter according to claim 1.

8. The roller shutter according to claim 1, wherein the transverse members are in contact with the stress limiting layer opposite the decorative lining.

9. The roller shutter according to claim 1, wherein the transverse members and the web are made integrally in one piece.

10. The roller shutter according to claim 1, wherein the transverse members and the web are distinct and joined together.

11. A roller shutter that extends in a longitudinal direction along which the roller shutter slides when mounted with respect to a container for selectively closing or opening an aperture of the container, the roller shutter comprising:
 a carrier;
 a decorative lining laminated over the carrier, wherein the decorative lining is a stratified wood sheet complex comprising a backing layer laminated to a decorative layer comprising a wood sheet having a visible face, the backing layer being laminated to the decorative layer at a side of the decorative layer opposite said visible face; and
 a stress limiting layer configured to limit stress imparted by the carrier on the decorative lining when bending the roller shutter, wherein the stress limiting layer is an intermediate layer laminated between the carrier and the backing layer of the decorative lining and has a hardness of more than 30 shore A,
 wherein the carrier comprises discrete transverse members extending transversely relative to the longitudinal direction, the transverse members being distributed along the roller shutter and spaced along the roller shutter,
 wherein the carrier comprises a continuous web joining the transverse members, and
 wherein the transverse members are located between the web and the decorative lining.

12. The roller shutter according to claim 11, wherein the transverse members are in contact with the stress limiting layer opposite the decorative lining.

13. A roller shutter that extends in a longitudinal direction along which the roller shutter slides when mounted with respect to a container for selectively closing or opening an aperture of the container, the roller shutter comprising:
   a carrier;
   a decorative lining laminated over the carrier, wherein the decorative lining comprises a backing layer and a decorative layer, the decorative layer comprises a lignocellulosic layer having a visible face, and the backing layer is laminated to the decorative layer at a side of the decorative layer opposite the visible face; and
   a stress limiting layer configured to limit stress imparted by the carrier on the decorative lining when bending the roller shutter,
   wherein the stress limiting layer is laminated between the carrier and the backing layer,
   wherein the carrier comprises a web joining the transverse members, and
   wherein the transverse members are located between the web and the decorative lining.

14. The roller shutter according to claim 13, wherein the decorative lining is a stratified wood sheet complex in which the lignocellulosic layer is a wood sheet.

15. The roller shutter according to claim 13, wherein the web is a continuous web.

16. The roller shutter according to claim 13, wherein the stress limiting layer has a hardness of more than 30 shore A.

17. The roller shutter according to claim 13, wherein the stress limiting layer is made of silicone or polyurethane.

18. The roller shutter according to claim 13, wherein the transverse members are in contact with the stress limiting layer opposite the decorative lining.

19. The roller shutter according to claim 13, wherein the transverse members and the web are made integrally in one piece.

20. The roller shutter according to claim 13, wherein the transverse members and the web are distinct and joined together.

* * * * *